United States Patent
Campbell et al.

(10) Patent No.: US 10,336,941 B2
(45) Date of Patent: Jul. 2, 2019

(54) IMPACT-MODIFIED HYDROXYAPATITE AS FLAME RETARDANT POLYMER FILLERS

(71) Applicant: International Business Machines Corporation, Armonk, NY (US)

(72) Inventors: Eric J. Campbell, Rochester, MN (US); Sarah K. Czaplewski, Rochester, MN (US); Brandon M. Kobilka, Tucson, AZ (US); Jason T. Wertz, Pleasant Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 182 days.

(21) Appl. No.: 15/621,311

(22) Filed: Jun. 13, 2017

(65) Prior Publication Data

US 2018/0355251 A1    Dec. 13, 2018

(51) Int. Cl.
| | | |
|---|---|---|
| C09K 21/12 | (2006.01) | |
| C08K 5/03 | (2006.01) | |
| C08K 3/32 | (2006.01) | |
| C08K 5/00 | (2006.01) | |
| C08K 9/08 | (2006.01) | |

(52) U.S. Cl.
CPC ............ C09K 21/12 (2013.01); C08K 3/32 (2013.01); C08K 5/0066 (2013.01); C08K 5/03 (2013.01); C08K 9/08 (2013.01); *C08L 2201/02* (2013.01)

(58) Field of Classification Search
CPC ........ C09K 21/12; C08K 3/32; C08K 5/0066; C08K 5/03; C08K 9/08; C08L 2201/02
See application file for complete search history.

(56) References Cited

FOREIGN PATENT DOCUMENTS

| CN | 105885529 A | 8/2016 |
|---|---|---|
| CN | 105967550 A | 9/2016 |
| WO | 2015052495 A1 | 4/2015 |
| WO | 2015067091 A1 | 5/2015 |

OTHER PUBLICATIONS

Bozic et al., "Enzymatic phosphorylation of cellulose nanofibers to new highly-ions adsorbing, flame-retardant and hydroxyapatite-growth induced natural nanoparticles," Cellulose, Aug. 2014, vol. 21, Issue 4, pp. 2713-2726, ® Springer Science+Business Media Dordrecht 2014. DOI: 10.1007/s10570-014-0281-8.
Dholakiya, B., "Use of non-traditional fillers to reduce flammability of polyester resin composites," Polimeri 30(1), Jan. 2009, pp. 10-17.
Dong et al., "Thermal Properties and Flame Retardancy of Polycarbonate/Hydroxyapatite Nanocomposite," Journal of Applied Polymer Science, vol. 109, Issue 1, Jul. 2008, pp. 659-663. DOI: 10.1002/app.28053.
Lu et al., "Highly Flexible and Nonflammable Inorganic Hydroxyapatite Paper," Chemistry: A European Journal, vol. 20, Issue 5, Jan. 2014, pp. 1242-1246. DOI: 10.1002/chem.201304439.
"Hydroxylapatite," Wikipedia—the free encyclopedia, printed Feb. 27, 2017, pp. 1-5. https://en.wikipedia.org/wiki/Hydroxylapatite.
Kobilka et al., "Flame-Retardant Impact Modifier," U.S. Appl. No. 15/181,963, filed Jun. 14, 2016.
Kobilka et al., "Functionalized Carbon Nanotubes," U.S. Appl. No. 15/294,106, filed Oct. 14, 2016.
"Accelerated Examination Support Document," International Business Machines Corporation, Dated Feb. 15, 2018, 11 pages.
Campbell et al., "Impact-Modified Hydroxyapatite as Flame Retardant Polymer Fillers," U.S. Appl. No. 15/902,298, filed Feb. 22, 2018.
List of IBM Patents or Patent Applications Treated as Related, Dated Feb. 20, 2018, 2 pages.

*Primary Examiner* — Wenwen Cai
(74) *Attorney, Agent, or Firm* — Jared C. Chaney

(57) ABSTRACT

A process for forming an impact-modified flame retardant polymer fillers, as well as the impact-modified flame retardant polymer filler, are disclosed. A polymer filler is an additive that can be added to a polymer matrix. The polymer filler can be mixed or otherwise incorporated into a polymer to modify the properties of a polymer matrix to create the flame retardant material. The impact-modified flame retardant polymer fillers can include an impact-modified hydroxyapatite filler.

13 Claims, 5 Drawing Sheets

IMPACT-MODIFIED HYDROXYAPATITE AS FLAME RETARDANT POLYMER FILLERS

BACKGROUND

Hydroxyapatite is a naturally occurring mineral form of calcium apatite with the chemical formula $Ca_5(PO_4)_3(OH)$, but it is usually written $Ca_{10}(PO_4)_6(OH)_2$ to denote that the crystal unit cell comprises two entities.

SUMMARY

Some embodiments discussed herein are related to impact-modified flame retardant polymer fillers. A polymer filler is an additive that can be added to a polymer matrix. The polymer filler can be mixed or otherwise incorporated into a polymer to modify the properties of a polymer matrix to create the flame retardant material. Some embodiments include an impact-modified hydroxyapatite filler.

Some embodiments include compounds that may be used in impact-modified flame retardant polymers.

Some embodiments include a flame resistant hydroxyapatite-based compound comprising a particle of hydroxyapatite and "optionally substituted" polybutadiene styrene.

Some embodiments include a composition comprising a compound described herein.

Some embodiments include an article of manufacture containing a compound described herein.

Some embodiments include an impact resistant compound represented by a formula:

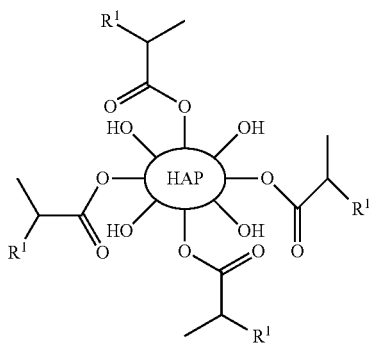

wherein $R^1$ comprises "optionally substituted" poly(co-styrene-co-butadiene), and wherein the sphere labeled HAP represents the hydroxyapatite particle.

DETAILED DESCRIPTION

Figure 1:
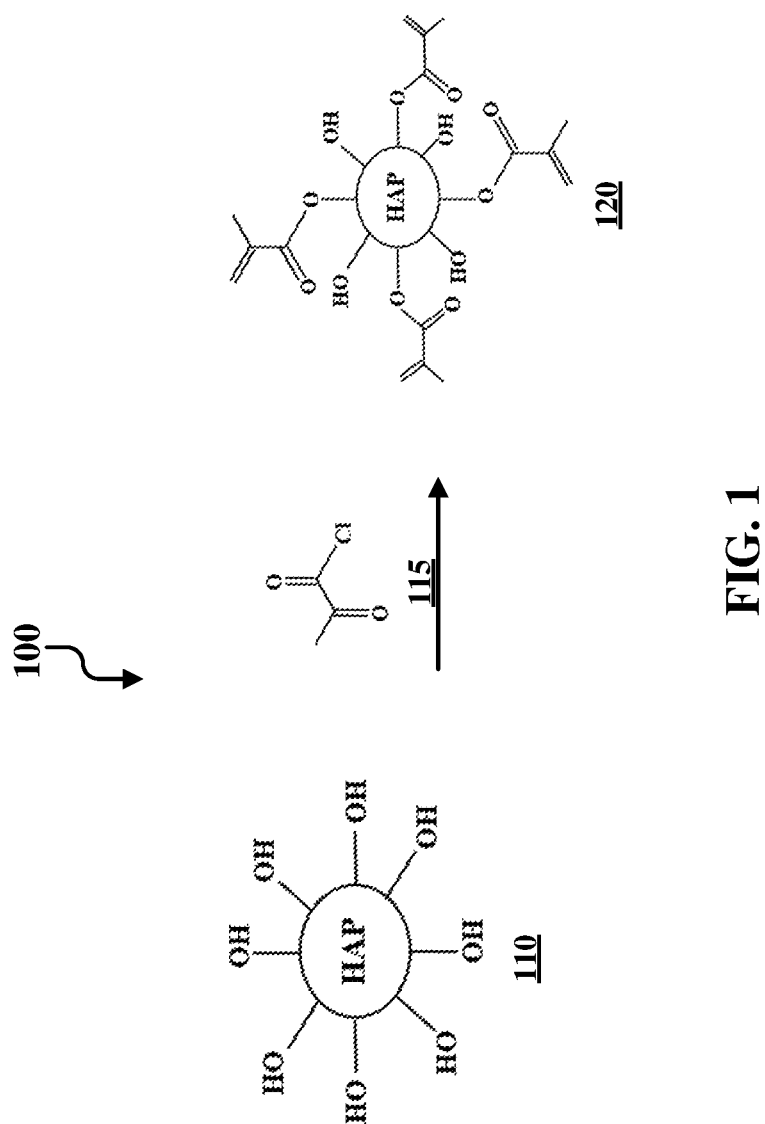
FIG. 1 illustrates an example synthesis diagram representing a synthesis of impact-modified hydroxyapatite.

Bio-based or otherwise renewable compounds are increasingly being used in the syntheses of substances that previously required petroleum-based raw materials. One benefit of bio-based compounds is that they are derived from renewable resources. Therefore, these compounds have applications in sustainable, or "green," materials. Sustainable materials are becoming more and more prevalent, due to the rising costs of fossil fuels and increasing environmental regulatory controls. Advances in biotechnology have provided numerous strategies for efficiently and inexpensively producing bio-based compounds on an industrial scale. Examples of these strategies include plant-based or microorganism-based approaches. Plant-based approaches can involve obtaining a material directly from a plant, or growing plant tissues or cells that can produce bio-based compounds from various substrates using their own biosynthetic pathways. Microorganism-based approaches involve using native or genetically-modified fungi, yeast, or bacteria to produce a desired compound from a structurally similar substrate.

Examples of uses for bio-based compounds include polymers, polymer fillers, flame retardants, cross-linkers, etc. In some examples, bio-based polymers and petroleum-based polymers are blended to form a polymer composite. In another example, bio-based polymers and bio-based fillers are blended to form a polymer composite. Polymers can be entirely bio-based, or produced from a combination of bio- and petroleum-based monomers. Bio-based compounds can impart flame-retardant properties to bio- and petroleum-based polymers. For example, flame-retardant monomers or cross-linkers can be incorporated into polymers. Additionally, flame-retardant small molecules can be blended with the polymers. In some embodiments fillers can be blended with polymers. Fillers can include properties that can increase impact resistance of a polymer. Hydroxyapatite is a naturally occurring mineral form of calcium apatite. In some embodiments, fillers can be modified with substituents to increase the impact resistance of a polymer matrix including flame retardant fillers. For example, fillers can include hydroxyapatite.

Unless otherwise indicated, when a compound or chemical structural feature such as aryl is referred to as being "optionally substituted" it includes a feature that has no substituents (i.e., unsubstituted), or a feature that is "substituted," meaning that the feature has one or more substituents. The term "substituent" includes a moiety that replaces one or more hydrogen atoms attached to a parent compound or structural feature. For example, $CH_4$ can be substituted with chlorine to give $CH_3Cl$. In some embodiments, a substituent may be an ordinary organic moiety known in the art, which may have a molecular weight (e.g., the sum of the atomic masses of the atoms of the substituent) of 15 g/mol to 50 g/mol, 15 g/mol to 100 g/mol, 15 g/mol to 150 g/mol, 15 g/mol to 200 g/mol, 15 g/mol to 300 g/mol, or 15 g/mol to 500 g/mol. In some embodiments, a substituent comprises or consists of: 0-5 or 0-2 carbon atoms; and 0-5 or 0-3 heteroatoms, wherein each heteroatom may independently be: N, O, S, Si, F, Cl, Br, or I; provided that the substituent includes at least one C, N, O, S, Si, F, Cl, Br, or I atom. In other embodiments, examples of substituents can include, but are not limited to, optionally substituted alkyl, alkenyl, alkynyl, heteroalkyl, heteroalkenyl, heteroalkynyl, aryl, heteroaryl, hydroxy, alkoxy, aryloxy, acyl, acyloxy, alkylcarboxylate, thiol, alkylthio, cyano, halo, thiocarbonyl, O-carbamyl, N-carbamyl, O-thiocarbamyl, O-phenyl, N-thiocarbamyl, C-amido, N-amido, S-sulfonamido, N-sulfonamido, isocyanato, thiocyanato, isothiocyanato, nitro, phosphoryl, phosphonyl, silyl, sulfenyl, sulfinyl, sulfonyl, haloalkyl, haloalkoxyl, trihalomethanesulfonyl, trihalomethanesulfonamido, amino, etc. Wherever a substituent is described as "optionally substituted," that substituent can be substituted with the above substituents. In some embodiments, when a substituent is phosphorus-based, the substituent should be understood to include a phosphate, phosphonate, phosphoryl, or phosphonyl moiety.

"Aryl" refers to an aromatic substituent that may be a single ring or multiple rings. The aromatic rings of the aryl group may each and optionally contain heteroatoms, for example, as in phenyl, pyridine, pyrazine, pyrimidine, carbazolyl or imidazole. The aryl group can be optionally substituted with one or more aryl group substituents which can be the same or different, where "aryl group substituent" includes alkyl, aryl, arylalkyl, hydroxy, alkoxyl, aryloxy, arylalkoxyl, carboxy, nitrile, acyl, halo, nitro, alkoxycarbonyl, aryloxycarbonyl, arylalkoxycarbonyl, acyloxyl, acylamino, aroylamino, carbamoyl, alkylhalide, alkylcarbamoyl, dialkylcarbamoyl, arylthio, alkylthio, alkylene, boronic acid, and —NRR', where R and R' can be each independently hydrogen, alkyl, aryl and -alkyl-aryl.

In some embodiments, the number of carbon atoms in an alkyl substituent or moiety can be specified herein. For example, a substituent described as "optionally substituted $C_{1-6}$ alkyl" should be understood to be an alkyl-based moiety that has between one and six carbons that can be optionally substituted with substituents as described above.

For convenience, the term "molecular weight" is used with respect to a moiety or part of a molecule to indicate the sum of the atomic masses of the atoms in the moiety or part of a molecule, even though it may not be a complete molecule.

The structures associated with some of the chemical names referred to herein are depicted below. These structures may be unsubstituted, as shown below, or a substituent may independently be in any position normally occupied by a hydrogen atom when the structure is unsubstituted. Unless a point of attachment is indicated by

or, attachment may occur at any position normally occupied by a hydrogen atom.

Some embodiments include a compound of any of the following formulas:

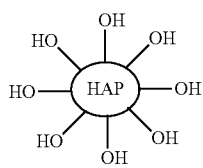

Formula 1

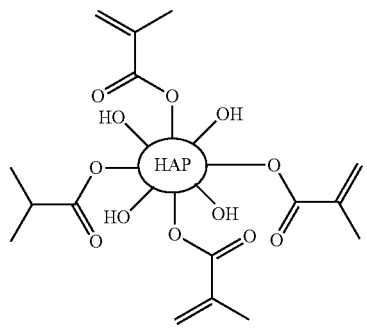

Formula 2

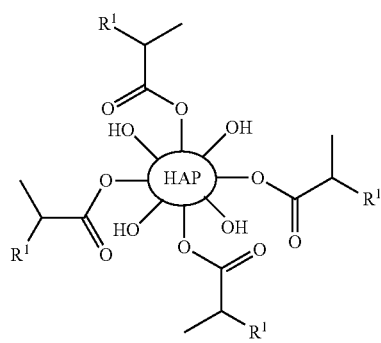

Formula 3

With respect to any relevant formula or structural representation herein, such as Formula 3, $R^1$ can be H, optionally substituted $C_{1-6}$ alkyl, optionally substituted

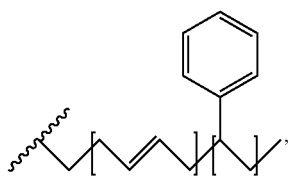

optionally substituted

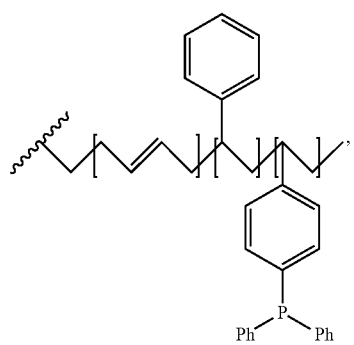

optionally substituted

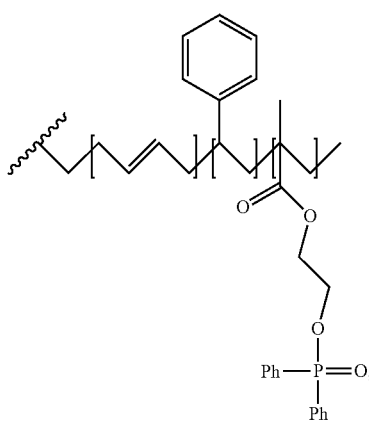

or optionally substituted

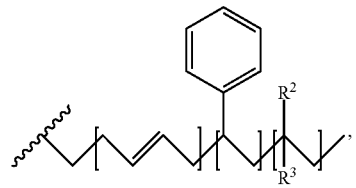

wherein $R^2$ and $R^3$ can be independently selected from H, methyl, optionally substituted $C_{1-6}$ alkyl, optionally substituted

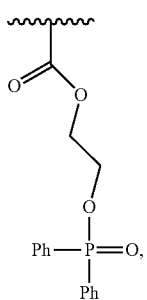 [SMILES: *C(=O)OCCOP(=O)(c1ccccc1)c1ccccc1]

or optionally substituted

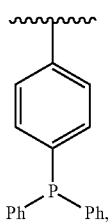

and wherein Ph is optionally substituted phenyl or optionally substituted aryl, and wherein HAP is a hydroxyapatite particle.

In some embodiments, such as the disclosure above, for example Formula 3, $R^2$ can be H or optionally substituted $C_{1-3}$ alkyl. In some embodiments, $R^2$ is methyl. In some embodiments, $R^2$ is H.

With respect to any relevant formula or structural representation herein, such as Formula 3 or the disclosure above, $R^3$ can be H, optionally substituted $C_{1-6}$ alkyl, optionally substituted

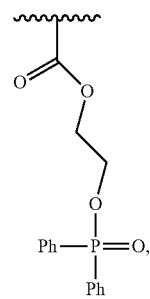 [SMILES: *C(=O)OCCOP(=O)(c1ccccc1)c1ccccc1]

or optionally substituted

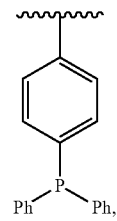

wherein Ph is optionally substituted phenyl or optionally substituted aryl.

In some embodiments, such as the disclosure above, for example, Formula 1, HAP is a particle of hydroxyapatite. As shown in FIG. 1, hydroxyapatite 110 represents unsubstituted hydroxyapatite with hydroxyl groups orthogonal to the surface of the particle. While eight hydroxyl groups are shown in FIG. 1 for hydroxyapatite 110 it should be understood that this is simply to illustrate the chemical structure of the substituents, and not a representation of the number of substituents. A particle of hydroxyapatite can have a range of different particle sizes and will likely have many more than eight hydroxyl groups. For example, a particle of hydroxyapatite 110 can be a nanoparticle, a microparticle, etc. The particle 110 can have a diameter of 10 nm, 100 nm, 1 micron, 100 micron, or larger etc., or any other particle size. In one illustrative embodiment, a first particle of hydroxyapatite that is a first diameter might have 50 to 100 substituents, whereas a second particle of hydroxyapatite that is twice the diameter of the first particle might have 200 to 400 or more substituents. Larger particles can typically have more surface area and can have more substitutable positions than smaller particles.

Polymers as disclosed herein can also include one or more other polymers. Examples of polymers can include epoxy, a polyhydroxyurethane, a polycarbonate, a polyester, a polyacrylate, a polyimide, a polyamide, a polyurea, a poly(vinylester), etc. The combining of polymers can include chemical cross-linking, mixing, blending, forming a matrix, a composite of different polymers, etc. In some embodiments, the copolymer or monomer ratio can be used to control the properties of a product polymer. For example, a precursor copolymer ratio of 1:10 (substituted to unsubstituted monomers) before polymerization would result in a polymer that has a 1:10 ratio of substituted to unsubstituted monomers. In some embodiments, a polymer with a 1:10 copolymer ratio can have different properties than a polymer with a 1:20 copolymer ratio.

In some embodiments, the polymers disclosed herein can be used as single component materials, part of blended polymeric materials, or as components of composite materials. In some embodiments, the polymers disclosed herein can be added to other materials to add to the flame retardancy characteristics of the material being modified. In some embodiments, multiple flame retardant monomers can be blended with an unsubstituted monomer to form a final polymer. In some embodiments, blending is done after polymerization.

One example of a polymer that can be made flame-retardant by the addition of flame-retardant fillers as disclosed herein is polycarbonate-acrylonitrile butadiene styrene (PC-ABS), a plastic that is often used in electronics hardware. The flame retardant polymers disclosed herein can also be incorporated into polyurethane. Polyurethane is a versatile polymer used in applications that include acoustic dampening, cushioning, plastics, synthetic fibers, insulation, adhesives, etc. The polymers disclosed herein can also be added to adhesives such as bio-adhesives, elastomers, thermoplastics, emulsions, thermosets, etc. Further, materials containing the polymers disclosed herein can be incorporated into various devices with electronic components that can include printed circuit boards (PCBs), semiconductors, transistors, optoelectronics, capacitors, resistors, etc.

Resins for printed circuit boards (PCBs) can be made flame-retardant by incorporating flame retardant fillers as disclosed herein. PCBs are electrical circuits that can be found in most types of electronic device, and they support and electronically connect electrical components in the device. PCBs are formed by etching a copper conductive layer laminated onto an insulating substrate. The insulating substrate can be a laminate comprising a resin and a fiber. Many resins in PCBs contain a polymer, such as an epoxy, a polyhydroxyurethane, a polycarbonate, a polyester, a polyacrylate, a polyimide, a polyamide, a polyurea, a poly(vinylester), etc. Flame-retardant polymers as disclosed herein can be added to the resin in order to prevent the PCB from catching fire when exposed to high temperature environments or electrical power overloads. In some embodiments, flame retardant polymers as disclosed herein when added to other materials, such as those discussed above, can add to the self-extinguishing characteristics of materials that have been exposed to an open flame. For example, any article of manufacture or composition can have incorporated therein a flame retardant compound as disclosed herein.

Impact-modified fillers as disclosed herein are fillers that can be incorporated into a polymer matrix. Incorporation of a filler into a polymer matrix can include mixing, chemical cross-linking, composite layering, or any other method of combining a polymer with a filler. In some embodiments, any additive to a polymer composite can be a filler. Additives and fillers can be combined with a polymer to modify the properties of the polymer. Some material properties of polymers that can be modified with filler additives can include impact resistance, pliability, rigidity, flexibility, tensile strength, modulus, elasticity, stiffness, dynamic modulus, durability, abrasion resistance, compressive strength, shear strength, etc. In some embodiments, the filler is compounded with and/or covalently bonded to a polymer or polymer blend.

It should be noted that, in some embodiments, the compounds described herein can contain one or more chiral centers. These can include racemic mixtures, diastereomers, enantiomers, and mixtures containing one or more stereoisomer. Further, the compounds described herein can encompass racemic forms of the compounds in addition to individual stereoisomers, as well as mixtures containing any of these.

The synthetic processes discussed herein and their accompanying drawings are prophetic examples, and are not limiting; they can vary in reaction conditions, components, methods, etc. In addition, the reaction conditions can optionally be changed over the course of a process. Further, in some embodiments, processes can be added or omitted while still remaining within the scope of the disclosure, as will be understood by a person of ordinary skill in the art.

FIG. 1 illustrates an example synthesis 100 of functionalized hydroxyapatite particles. Hydroxyapatite particles 110 are functionalized via nucleophilic acyl substitution with methacryloyl chloride 115 to yield methyl methacrylate-functionalized hydroxyapatite particles 120.

Figure 2:
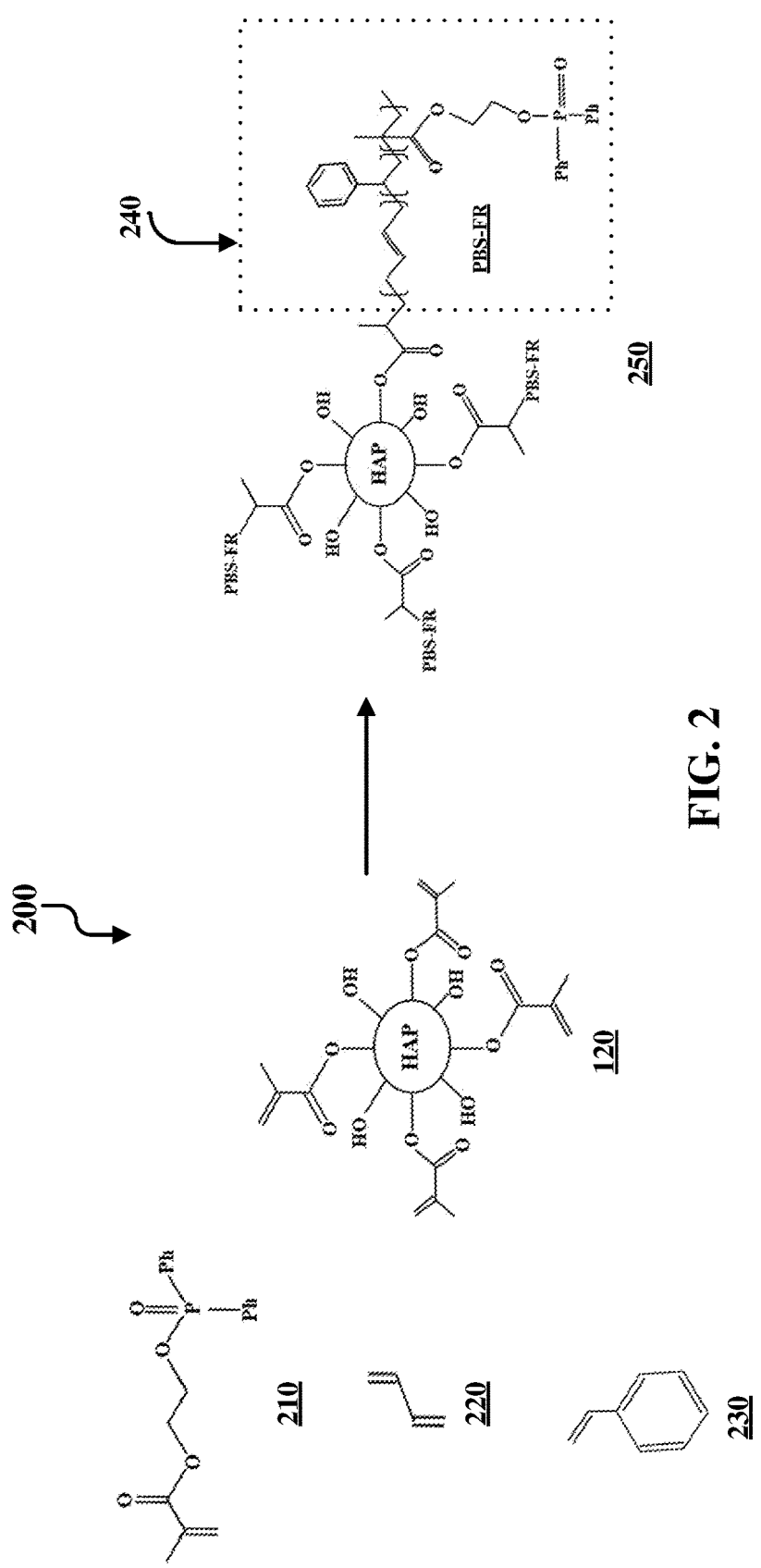
FIG. 2 illustrates an example synthesis of further functionalization of functionalized hydroxyapatite particles.

FIG. 2 illustrates an example synthesis 200 of further functionalization of functionalized hydroxyapatite particles. Specifically, the hydroxyapatite impact modifier/filler functionalized with poly(methyl methacrylate-co-styrene-co-butadiene) (PMMA/BS). Compound 250 is formed by the polymerization of methyl methacrylate-functionalized hydroxyapatite particles 120, styrene 230, butadiene 220, and a phosphorus-containing acrylate 210 via reversible addition-fragmentation chain transfer (RAFT) polymerization or by any polymerization technique. For example, radical polymerization techniques can be used. Radical polymerization techniques can include using thermal initiators, UV initiators, controlled radical polymerization, etc. The substituent PBS-FR for compound 250 is specifically shown in FIG. 2 in box 240. This substituent is indicated by PBS-FR on other locations of the compound 250.

Figure 3:
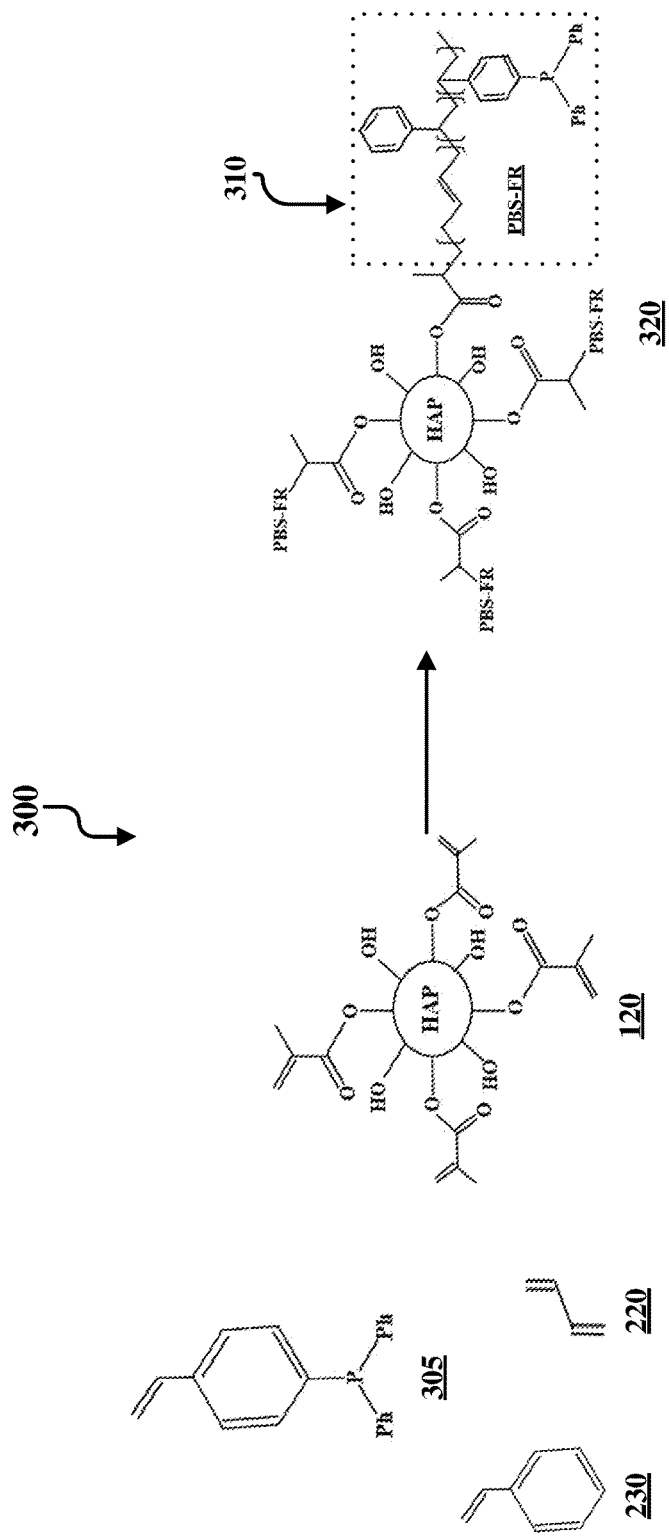
FIG. 3 illustrates an example synthesis of further functionalization of functionalized hydroxyapatite particles.

FIG. 3 illustrates an example synthesis 300 of further functionalization of functionalized hydroxyapatite particles. Specifically, the hydroxyapatite impact modifier/filler functionalized with poly(methyl methacrylate-co-styrene-co-butadiene) 320 is formed by the polymerization of methyl methacrylate-functionalized hydroxyapatite particles 120, styrene 230, butadiene 220, and 4-(diphenylphosphino)styrene 305 by any of the polymerization techniques listed above in the FIG. 2 discussion. The substituent PBS-FR on compound 320 is specifically shown in FIG. 3 in box 310. This substituent is indicated by PBS-FR on other locations of the functionalized HAP compound 320.

Figure 4:
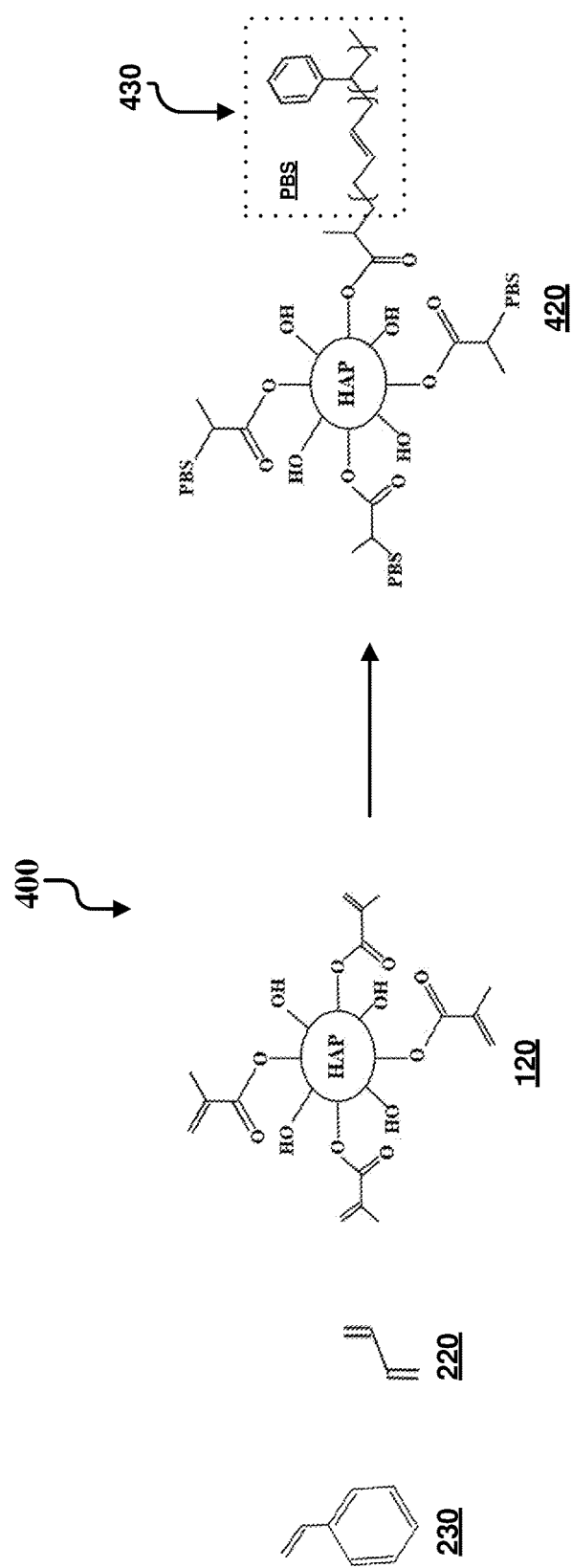
FIG. 4 illustrates an example synthesis of further functionalization of functionalized hydroxyapatite particles.

FIG. 4 illustrates an example synthesis 400 of functionalization of functionalized hydroxyapatite particles. Specifically, a hydroxyapatite impact modifier/filler functionalized with poly(methyl methacrylate-co-styrene-co-butadiene) 420 is formed by the polymerization of methyl methacrylate-functionalized hydroxyapatite particles 120, styrene 230, and butadiene 220, or by any of the polymerization techniques listed above in the FIG. 2 discussion. The substituent PBS for compound 420 is specifically shown in FIG. 4 in box 430. This substituent is indicated by PBS on other locations of the functionalized HAP compound 420. It can be noted that the poly(methyl methacrylate-co-styrene-co-butadiene) derivative in this example does not include a flame retardant moiety.

Figure 5:
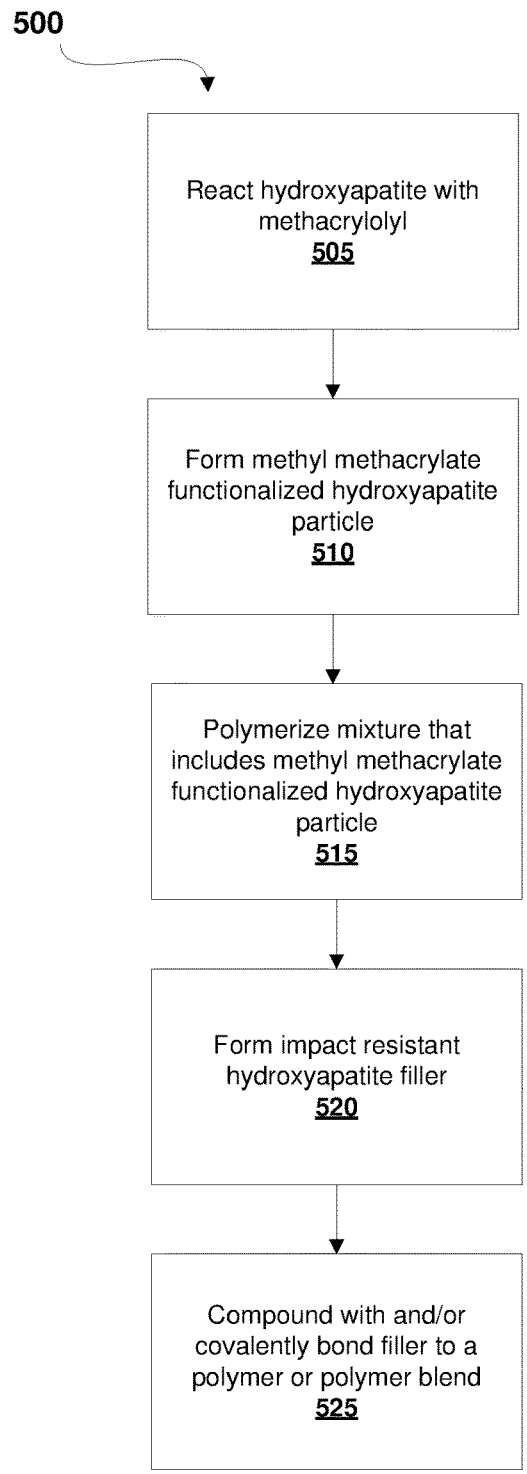
FIG. 5 illustrates an example process for forming an impact-modified hydroxyapatite particles.

FIG. 5 illustrates a process 500 of forming an impact resistant hydroxyapatite-based filler. The process begins with chemically reacting a hydroxyapatite particle 110 with methacryloyl 115. This is illustrated at step 505. This reaction forms a methyl methacrylate-functionalized hydroxyapatite particle 120. This is illustrated at step 510. Steps 505 and 510 are also together illustrated in FIG. 1. The process continues by combining a mixture that includes the methacrylate-functionalized hydroxyapatite particle 120 with other reagents. This is illustrated at step 515. At this step, depending on the intended product, a number of different reagents can be used. For example, to synthesize compound 250, as illustrated in FIG. 2, the compound is formed by the polymerization of methyl methacrylate-functionalized hydroxyapatite particles 120, styrene 230, butadiene 220, and a phosphorus-containing acrylate 210 via RAFT polymerization or by any polymerization technique to form an impact resistant hydroxyapatite filler. This is illustrated at step 515. Further variations of step 515 are illustrated in FIG. 3 and FIG. 4, which require different reagents, as shown in their respective figures. Following the polymerization step 515, the impact resistant hydroxyapatite filler is formed. This is illustrated at step 520. Example products of this step include compound 250, as illustrated in FIG. 2, compound 320, as illustrated in FIG. 3, and compound 420, as illustrated in FIG. 4. However, it should be understood that other products can be formed using different starting materials at step 515. The filler product can then be compounded with and/or covalently bonded to a polymer or polymer blend. This is illustrated at step 525.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the specification and attached claims are approximations that may vary depending upon the properties sought to be obtained. At the very least, and not as an attempt to limit the application of the doctrine of equivalents to the scope of the claims, each numerical parameter should at least be construed in light of the number of reported significant digits and by applying ordinary rounding techniques.

The terms "a," "an," "the" and similar referents used in the context of describing the invention (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., "such as") provided herein is intended merely to better illuminate the invention and does not pose a limitation on the scope of any claim. No language in the specification should be construed as indicating any non-claimed element essential to the practice of the invention.

Groupings of alternative elements or embodiments disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified, thus fulfilling the written description of all Markush groups used in the appended claims.

Certain embodiments are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the invention to be practiced otherwise than specifically described herein. Accordingly, the claims include all modifications and equivalents of the subject matter recited in the claims as permitted by applicable law. Moreover, any combination of the above-described elements in all possible variations thereof is contemplated unless otherwise indicated herein or otherwise clearly contradicted by context.

In closing, it is to be understood that the embodiments disclosed herein are illustrative of the principles of the claims. Other modifications that may be employed are within the scope of the claims. Thus, by way of example, but not of limitation, alternative embodiments may be utilized in accordance with the teachings herein. Accordingly, the claims are not limited to embodiments precisely as shown and described.

What is claimed is:

1. An impact resistant hydroxyapatite-based compound comprising hydroxyapatite functionalized with optionally substituted poly(butadiene-co-styrene).

2. The compound of claim 1, wherein the optionally substituted poly(butadiene-co-styrene) is optionally substituted poly(methyl methacrylate-co-styrene-co-butadiene).

3. The compound of claim 2, wherein the optionally substituted poly(methyl methacrylate-co-styrene-co-butadiene) includes a phosphorus-based flame retardant moiety.

4. The compound of claim 1, wherein the hydroxyapatite is crystalline.

5. A process of forming an impact resistant hydroxyapatite-based filler comprising: chemically reacting a hydroxyapatite particle with a methacryloyl to form a methyl methacrylate-functionalized hydroxyapatite particle, polymerizing a mixture that includes the methyl methacrylate-functionalized hydroxyapatite particle to form the impact resistant hydroxyapatite filler.

6. The process of claim 5, wherein the mixture further includes butadiene and styrene.

7. The process of claim 5, wherein the mixture further includes a flame retardant monomer.

8. The process of claim 5, wherein the mixture does not include a flame retardant monomer.

9. The process of claim 5, wherein the hydroxyapatite particle is crystalline.

10. An impact resistant compound represented by a formula:

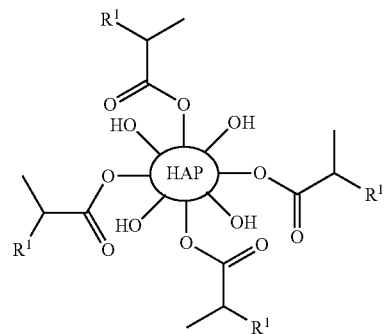

wherein $R^1$ comprises optionally substituted poly(butadiene-co-styrene), and HAP is a hydroxyapatite particle.

11. The compound of claim 10, wherein $R^1$ is further represented by

12. The compound of claim 10, wherein $R^1$ is further represented by

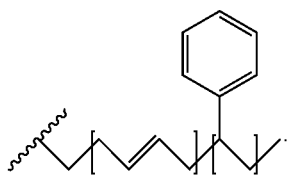

wherein $R^2$ is optionally substituted $C_{1-3}$ alkyl and wherein $R^3$ is optionally substituted

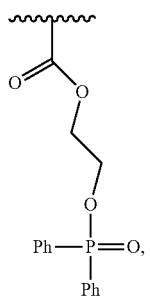 [SMILES: *C(=O)OCCOP(=O)(c1ccccc1)c1ccccc1]

or optionally substituted

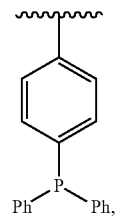

and wherein Ph is optionally substituted phenyl or optionally substituted aryl, and wherein HAP is a hydroxyapatite particle.

13. The compound of claim 12, wherein the hydroxyapatite particle is crystalline.

* * * * *